United States Patent [19]

Jex

[11] 4,240,997
[45] * Dec. 23, 1980

[54] EXTRUSION TECHNIQUE WITH RAM SPEED CONTROL

[76] Inventor: Edward R. Jex, 475 Hickory Lance, Berwyn, Pa. 19312

[*] Notice: The portion of the term of this patent subsequent to Feb. 27, 1996, has been disclaimed.

[21] Appl. No.: 918,436

[22] Filed: Jun. 23, 1978

Related U.S. Application Data

[62] Division of Ser. No. 646,897, Jan. 6, 1976, Pat. No. 4,141,678.

[51] Int. Cl.³ .............................................. B29F 3/06
[52] U.S. Cl. ................................. 264/40.5; 264/40.6; 264/40.7; 264/68; 425/144; 425/145; 425/146
[58] Field of Search ................. 264/40.7, 40.1, 176 R, 264/329, 40.5, 40.6, 68; 425/145–146, 379 R, 461, 144; 222/61

[56] References Cited

U.S. PATENT DOCUMENTS

| | | | |
|---|---|---|---|
| 2,207,405 | 7/1940 | Jacobson | 72/271 |
| 2,485,523 | 10/1949 | Ashbaugh | 425/145 |
| 3,354,501 | 11/1967 | Bachman et al. | 425/144 |
| 3,752,363 | 8/1973 | Fegley et al. | 425/145 |
| 3,865,528 | 2/1975 | Roess | 425/145 |

*Primary Examiner*—Jeffery R. Thurlow
*Attorney, Agent, or Firm*—Weiser, Stapler & Spivak

[57] ABSTRACT

The force applied to a ram is controlled so that the ram moves at a controlled speed while propelling material to be extruded through a die.

29 Claims, 4 Drawing Figures

EXTRUSION TECHNIQUE WITH RAM SPEED CONTROL

This is a division of application Ser. No. 646,897, filed Jan. 6, 1976, now U.S. Pat. No. 4,141,678, issued Feb. 27, 1979.

This invention relates to an improved machine and process for producing extrusions and the products resulting therefrom. The invention is particularly applicable to extrusions of thermosetting material, but it is also advantageous for thermoplastic materials.

It is known to make extrusions by means of a ram and die arrangement. Batches of the material to be extruded are introduced into a space ahead of the die. There they are picked up on the forward strokes of a reciprocating ram, which introduces them into the die and then propels them through the die. The ram pressure heats the material, particularly in the die "throat", which provides the constricting transition between the comparatively wide space ahead of the die and the comparatively narrow interior or bore of the die itself. Customarily, additional heat is externally supplied, e.g. by resistance heater bands surrounding the die, in sufficient amount to coact with the heat created by ram pressure to soften the material propelled through the die to the point where it tends to flow together into a viscuous mass within the die. This mass then is given its desired extrusion shape by the cross-sectional configuration of the die.

This seemingly simple procedure has proven very difficult to practice successfully, particularly with thermosetting materials. Such materials must first be heated, in order to make them soft enough to propel through the die. However, the application of heat also has the opposite effect, namely to harden these materials due to their tendency to polymerize in the presence of heat.

These two opposing effects have caused grave difficulty, and extrusions of thermosetting materials made as described above have frequently been unsatisfactory.

Sometimes they have included undesired interior voids. Sometimes they have included portions which still exhibited the original powdery or granular structure of the material, having evidently been insufficiently softened in the die. Sometimes they included portions which were not sufficiently polymerized. Sometimes the extrusions were misshapen. The foregoing are only illustrative of the wide variety of defects encountered in such extrusions.

Accordingly, it is a principal object of the present invention to eliminate one or more of the defects which characterized the prior art.

It is another object to provide a process of producing extrusions which yields products superior to those of the prior art.

It is another object to provide machinery for practicing this process.

It is another object to produce extrusions having improved properties.

It is another object to achieve the foregoing objects using thermosetting materials.

The foregoing objects, as well as others which will appear, are achieved by controlling the speed at which the ram moves while propelling batches of material into and through the die.

This speed is so controlled that during at least the end portion of its forward stroke (moving toward the die) the ram moves at a controlled speed which is independent of the back pressure produced by the material being extruded. The ram speed is substantially constant during this stroke portion.

During earlier portions of the forward stroke, the ram preferably moves at a higher speed, but subject to any speed-reducing back pressure effects which the material being extruded may exert on the ram.

Likewise, during the backward stroke (moving away from the die) the ram preferably moves at a higher speed. At that stage there is essentially no back pressure and nothing to impede such movement.

The controlled constant speed at which the ram moves during the end portion of its forward stroke is preferably established in such relationship to the heat created within the die by the combined effect of ram pressure and external heating that any given portion of the material passing through the die is subjected to sufficient heat to adequately soften that portion of the material substantially throughout.

For further details, reference is made to the detailed description which follows, in the light of the accompanying drawings, wherein:

FIG. 3 is a more detailed cross-sectional view of the ram-and-die portions of the machine of FIGS. 1 and 2.

The same reference numerals are used in the different figures to designate similar elements.

Figure 1:
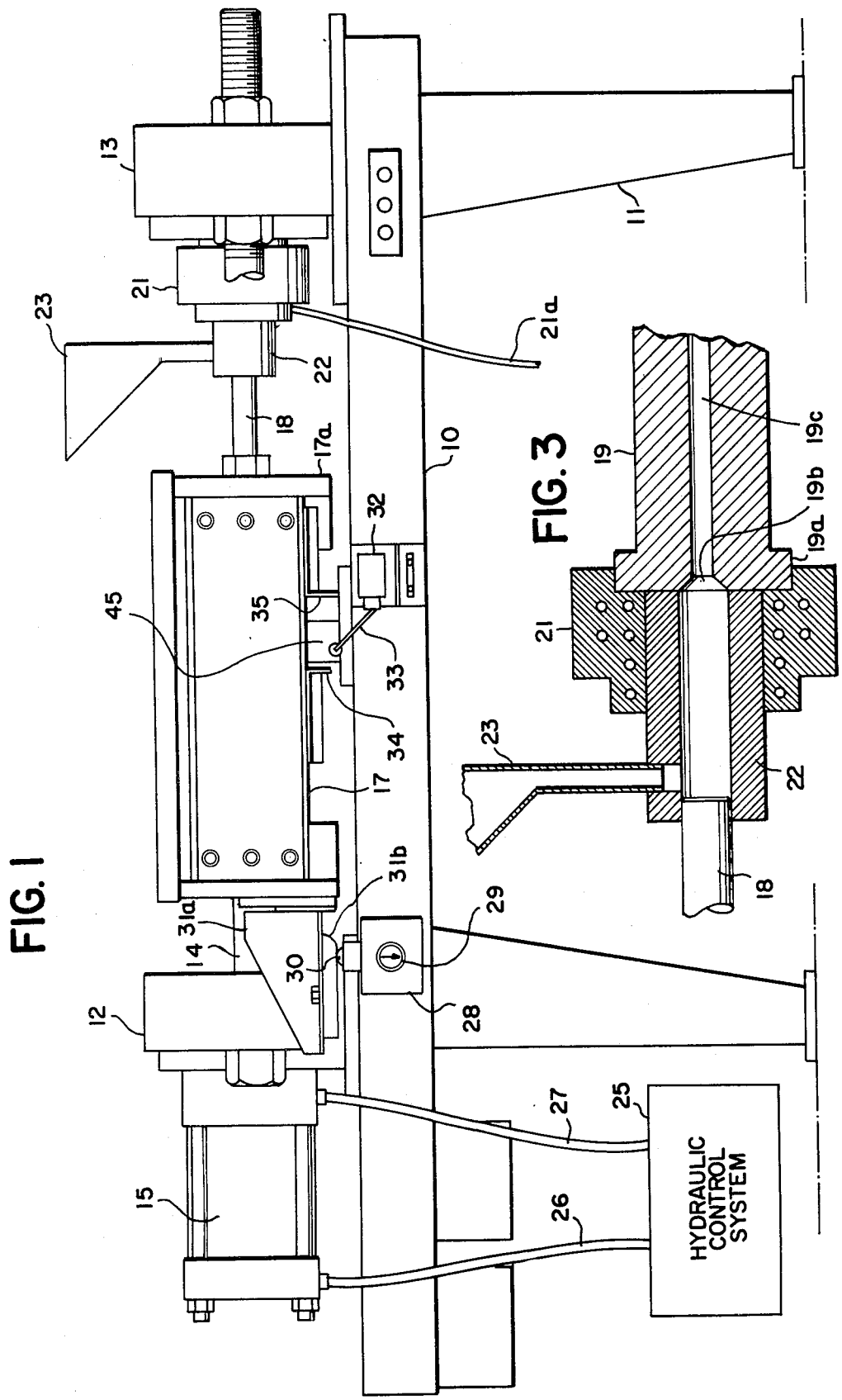
FIG. 1 is an over-all elevation view of a machine embodying the invention.
Figure 2:
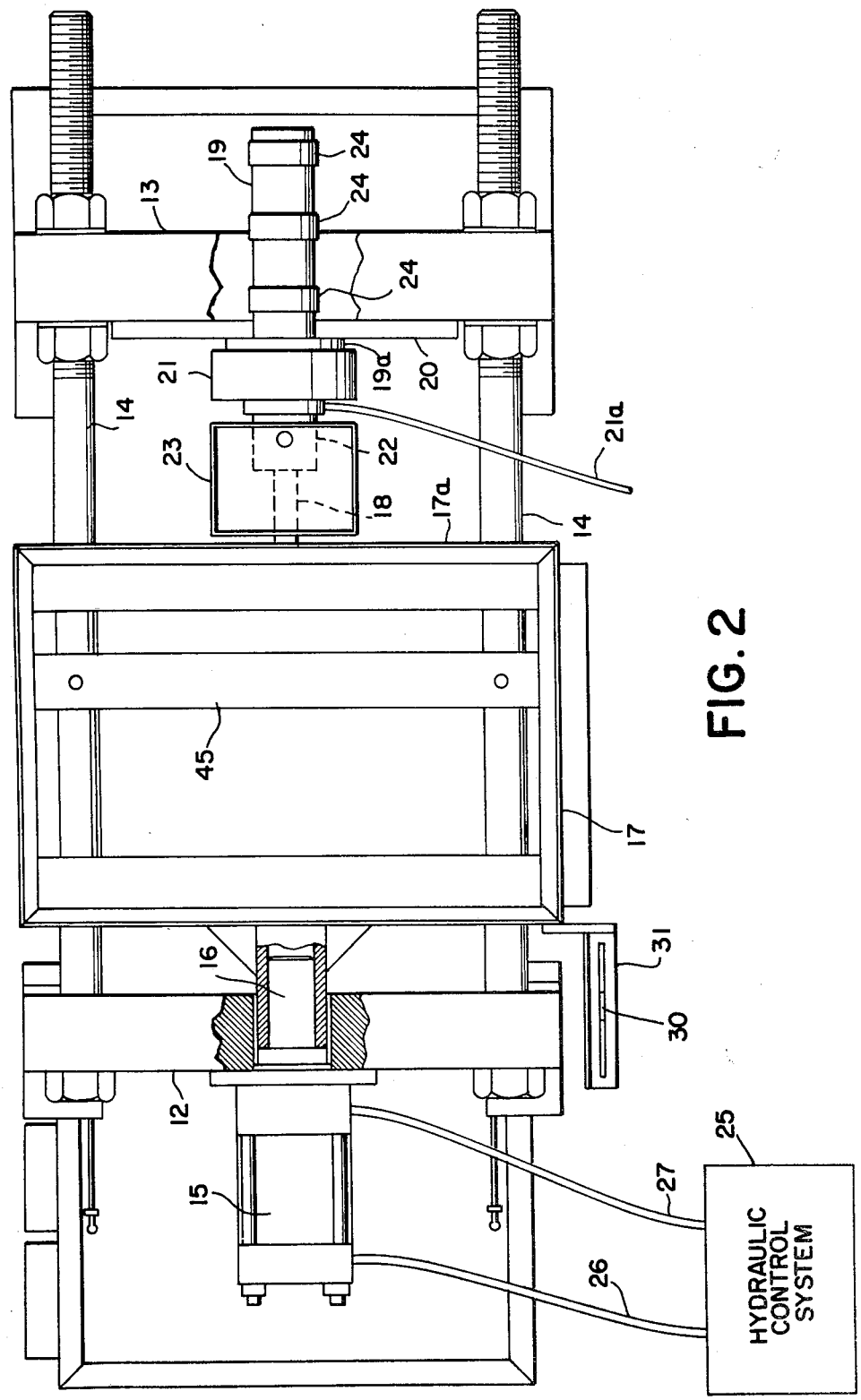
FIG. 2 is a top view of the machine of FIG. 1.

Referring to FIGS. 1 and 2, these show in elevation and top view, respectively, a machine embodying the present invention.

This machine includes bed 10 (FIG. 1) preferably mounted on legs 11 to raise the rest of the machinery to a level convenient for the operator. Firmly attached to bed 10 are two bolsters 12 and 13 which are further interconnected by lateral guide rods 14. Attached to bolster 12 is a hydraulic cylinder 15, from which piston rod 16 protrudes in the direction of bolster 13 through a suitable aperture in bolster 12. Attached to the protruding end of piston rod 16 is a generally rectangular carriage 17 mounted to be slidable along guide rods 14 in response to movements of piston rod 16. The cross member of carriage 17 remotest from piston rod 16 has provisions for attaching a ram 18. Bolster 13 is provided with suitable apertures for passing therethrough the body of a die 19 (see FIG. 2 in which such a die body is visible in the broken-away portion of bolster 13). Die 19 has an enlarged collar 19a, by means of which the die is seated against a die mounting plate 20 positioned between collar 19a and bolster 13.

Partly surrounding the portion of die 19 facing ram 18, and particularly part of die collar 19a, there is a cooling collar 21. Protruding from this cooling collar 21 in the direction of ram 18 is a filler section 22, which may be equipped with a funnel 23 for introducing material to be extruded into the filler section.

Hoses 21a are diagrammatically shown in FIGS. 1 and 2 for circulating cooling fluid through cooling collar 21. Resistance heater bands 24 encircle the body of die 19 as shown particularly in FIG. 2.

A hydraulic system 25 is connected to cylinder 15 through suitable connecting hoses 26 and 27.

A control unit 28 for system 25 is attached to bed 10. Unit 28 has a control knob 29 and has protruding from its top a cam follower wheel 30. A bracket 31a and linear cam 31b is attached to carriage 17 for movement with the carriage. Bracket 31a and linear cam 31b are so positioned relative to cam follower wheel 30 as to engage and depress that wheel during a portion of the path which carriage 17 follows closest to the die. On the other hand, linear cam 31b does not engage and depress wheel 30 during that portion of the path followed by carriage 17 which is farthest from die 19. The linear cam can be adjusted back and forth on bracket 31a to provide different engagement positions for cam follower wheel 30. The linear cam may also have different slopes so as to provide varying speeds of the ram.

A microswitch unit 32 is also attached to bed 10. This microswitch unit is provided with a switch lever 33 whose free end is engaged alternately by a projection 34 and a projection 35 extending down from carriage 17. Projection 34 engages the microswitch lever 33 when the carriage reaches its position closest to die 19, while projection 35 engages switch arm 33 when carriage 17 reaches a position comparatively far from die 19. In each case, a switching action is produced in microswitch unit 32. Engagement by the different projections reverses the switching state of unit 32.

FIG. 3, to which reference may now be had, shows a somewhat more detailed cross-sectional view of die 19, cooling jacket 21, filler section 22 and ram 18. In FIG. 3 that ram is shown partly engaged in filler section 22. Funnel 23 is kept filled with material to be extruded, which is normally in the form of powder, pellets or the like. When ram 18 moves away from die 19 to the point where it exposes the connection between funnel 23 and filler section 22, material to be extruded descends or is forced into the interior of section 22. When the ram again moves toward the die, this material is compressed by the ram and introduced under controllable pressure into the die through its tapering throat section 19b.

Figure 4:
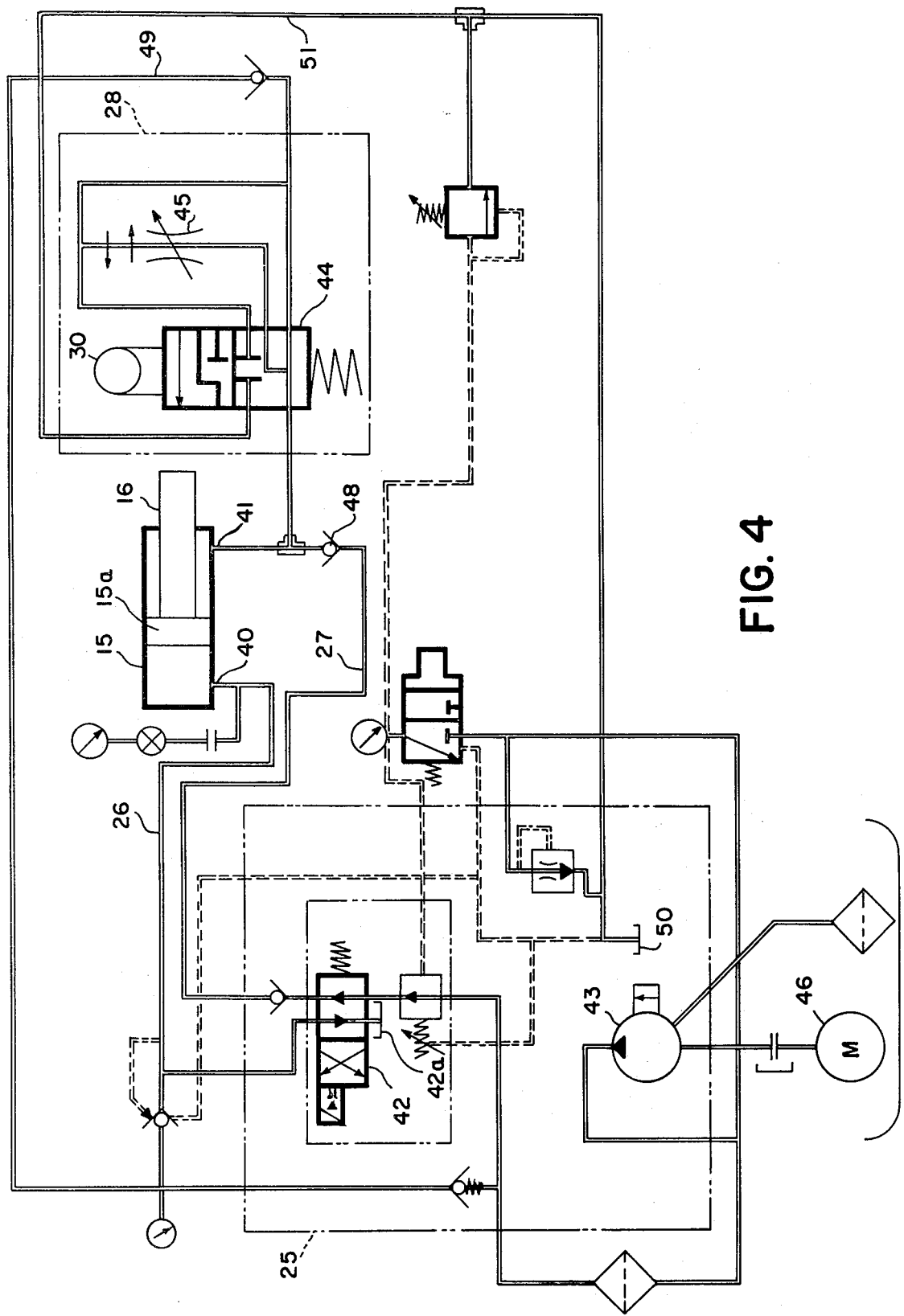
FIG. 4 is a diagram of a control system for the ram of FIGS. 1, 2 and 3.

FIG. 4, to which reference may now be made, diagrammatically illustrates the hydraulic components of the machine embodying the invention.

Cylinder 15 is a conventional double-acting cylinder with ports 40 and 41 on opposite sides of the piston 15a. Hoses 26 and 27 are connected to these ports, respectively. These hoses connect to a two-position directional control valve 42 forming part of hydraulic system 25 (FIG. 1). In the position of valve 42 illustrated in FIG. 4, hose 26 connects port 40 to tank at 42a while hose 27 connects port 41 to pump 43. In the alternate position of valve 42, port 40 is connected to the pump, while the connection between port 41 and pump 43 is broken.

Port 41 is further permanently connected to another two-position control valve 44 forming part of control unit 28 (see FIG. 1). Control unit 28 also includes a variable flow control valve 45 which is preferably of the type compensated for pressure and temperature variations. Valve 45 is adjusted by the knob 29 which is mounted on control unit 28 as shown in FIG. 1 Two position control valve 44 is switched between the position shown in FIG. 4 and its alternate position by the cam follower wheel 30 shown mounted on the top of control unit 28 of FIG. 1, in response to movement of carriage 17, and bracket 31a and linear cam 31b. The position of valve 44 shown in FIG. 4 corresponds to the undepressed position of cam follower wheel 30 in FIG. 1. The alternate position of valve 44 is brought about by depression of cam follower wheel 30. Valve 44 is spring biased into the position shown in FIG. 4 except when cam follower wheel 30 is depressed by bracket 31a (FIG. 1).

Reverting to valve 42, this is a solenoid operated valve. The solenoid is alternately energized and de-energized by microswitch 32 which is shown in FIG. 1, in response to engagement of its switch lever 33 alternately by downward projections 34 and 35. The position of valve 42 shown in FIG. 4 is that brought about by engagement of lever 33 by projection 35. The former occurs at the closest approach of ram 18 to die 19. The latter occurs after ram 18 has moved away from the die by the distance between projections 34 and 35. The spring bias for valve 42 restores the solenoid operated valve when the solenoid is de-energized. Cam 30 is depressed by linear cam 31b (FIG. 1). Valve 44 also has a slow rate slow-down feature which is determined by the slope of the linear cam 31b. This feature determines the deceleration of carriage 17. The speed of the compression stroke in the cam wheel engaged by the linear cam is determined by adjusting knob 29. The linear cam can be adjusted both in position and shape of cam to effect the proper deceleration from fast feed to the low speed setting on knob 29. This action provides an infinite number of speed transitions from high speed (low pressure) to low speed (high pressure).

To prepare the machine for operation, the appropriate ram and die combination is installed. Selection of these components is governed primarily by the requirements of the product to be extruded. The product shape determines the internal configuration of die 19. If the extrusion is to be a solid piece, a hollow-bore die as shown at 19 may be used without more. If the extrusion is to be hollow, e.g. a tube, a suitable mandrel (not shown) has to be positioned inside die 19. This mandrel may be attached in conventional manner to mandrel bolster 45 (FIGS. 1 and 2), passing through an appropriately shaped aperture within ram 18 and on into die 19. For hollow extrusions of comparatively small diameter, the mandrel may be attached in conventional manner within the die itself, by a spider of radial supports.

The body of die 19 is then surrounded by appropriately positioned resistance heating bands 24, its mounting collar 19a is engaged in cooling jacket 21 and filler section 22 is inserted into cooling jacket so as to mate with die 19, as shown in FIG. 3. Assuming that, initially, ram 18 is positioned by cylinder 15 as far from die 19 as movement of piston 15a within cylinder 15 permits, linear cam 31b (FIG. 1) is so positioned that it does not depress cam follower wheel 30 at that stage. Switch unit 32 is in that state in which it is placed by engagement of switch lever 33 by projection 35.

Under these conditions the hydraulic connections are such that pump 43, driven by motor 46, will introduce fluid through port 40 into cyliner 15. Simultaneously fluid will flow out of cylinder 15 through port 41. Check valve 48 (FIG. 4) keeps this fluid from hose 27 and directs it instead through valve 44 into hose 49 (FIG. 4) through which it is ultimately added to the fluid being introduced into cylinder 15 through port 40. As a result, a force will be exerted on piston 15a to move it in a direction which causes ram 18 to move toward die 19.

During this portion of the path followed by ram 18 toward the die, the force exerted on the ram by cylinder 15 will be opposed by the back pressure developed by the material in filling section 22 as that material starts to become compressed. This back pressure will be light, at first, allowing ram 18 to move essentially unimpeded. It will then increase gradually as the material becomes progressively compacted and begins to be forced into the constricting throat 19b of the die. As a result, the speed of the ram will tend to vary during this portion of the ram movement, generally inversely to the back pressure. After a forward movement sufficient to cause bracket 30 to depress cam follower wheel 30, thereby changing the position of valve 44, the fluid continuing to flow out of port 41 in response to continued movement of piston 15a will be directed through flow control valve 45 and ultimately to tank at 50 via hose 51. At this time the hydraulic pump will automatically provide high pressure to the compression circuit as determined by the pressure resistance in the system. As previously stated, the rate of fluid flow permitted through this valve 45 can be regulated by control knob 29. During the remaining portion of the movement of ram 18 toward the die, the speed of that ram will remain substantially constant, at a rate regulated by the setting of control knob 29 and the slope of linear cam 31b. Since valve 45 is pressure and temperature compensated, this ram speed remains so controlled (i.e. substantially constant) even in the presence of variations in the back pressure which ram 18 may encounter, as it moves closer and closer to throat 19b of die 19, and in the presence of variations in the temperature of the fluid passing through valve 45 due to such backpressure. Temperature and pressure compensated valves suitable for use as valve 45 are available, for example, from Racine Hydraulics, Inc., Racine, Wis., under the model number FC 6.

At the end of the desired movement of ram 18 toward die 19, downward projection 34 engages switch lever 33. This reverses the switch state of unit 32, causing solenoid operated valve 42 to assume the position in which it is shown in the FIG. 4. This disconnects port 40 of cylinder 15 from pump 43, and connects it instead to tank at 42a. Port 41 becomes connected to pump 43 through valve 42, and fluid is introduced into cylinder 15 through port 41. Conversely, fluid is withdrawn from port 40 and delivered to tank at 42a through hose 26 and valve 42. This ram movement along a path away from the die continues until downward protrusion 35 strikes switch lever 33, whereupon the cycle is completed and the machine again starts the cycle of operation described above.

The speed of movement of ram 18 toward die 19, during the portion of its path in which it is regulated by the linear cam 31b and the setting of knob 29 on control unit 28, is determined in accordance with the characteristics of the material to be extruded. In making this determination, the degree of heating of the die by external means, namely resistance heating bands 24, by the heating of compression, and by the exotherm of various compounds are a significant factor. Preferably this speed is no greater than that at which the combined heating effect of the ram pressure and the resistance heating is capable of softening the material being forced into the die uniformly throughout, to a degree sufficient for the formation of a homogeneous extrusion before the melt enters the throat. Even more preferred is a ram speed which is somewhat lower than the limiting speed defined above which produces a very homogeneous "melt".

Heretofore, the importance of this relationship between the speed of ram movement and the heating effects has either not been adequately recognized or, if it was, no adequate provisions were made in the extrusion machinery for bringing the desired relationship about. In the prior art, the main phenomenon which could be considered as determining the ram speed over this portion of its path has been the back pressure transmitted to the ram by the material being extruded. Since irregularities affecting this back pressure were common, uncontrolled changes in ram speed were also common. This caused heat transfer oscillations and hydraulic oscillations which sometimes were impossible to dampen out. These, in turn, further aggravated and compounded the irregularities in the material which gave rise to them.

This problem is surprisingly overcome by the present invention. The fact that the ram speed is controlled through control of the driving force applied to the ram, makes it possible to reliably establish the desired relationship between that speed and the heating of the material and to maintain this relationship with substantially no interference from irregularities such as previously mentioned. As a result, there is no aggravation of such irregularities, such as occurred in the prior art, and the products extruded are much less subject to defects. Indeed the very tendency toward the occurrence of such irregularities is actually counteracted, by the practice of the present invention. For example, local voids within the material due to excessive gas evolution will tend to not form. Any which still do form will not lead to sudden expulsion of extruded material from the die, as had been the case in the prior art.

Resins with stiffer-than-normal melt flow rates will tend to not slow down the material. Any that still do, will not affect the continued extrusion of the material and particularly of those portions which do not exhibit such irregularity.

Another important advantage of the invention is that is makes possible, in most cases, to omit the high pressure of clamps on the exit from the die which had been used in the prior art in attempting to control the back pressure created by the material. This omission eliminates the strong tendency toward deformation of the extruded product attributable to such exit clamps.

Another important and unexpected advantage of the present invention is that the desired controlled ram speed can be obtained using substantially lower ram driving force than has been the case heretofore. This also stems from the fact that no severe constriction of the die exit needs to be provided, which greatly reduces the back pressure and also the force needed to move the ram. This is beneficial in a number of important respects. The hydraulic force developing portions of the machine need not be as powerful as in the prior art. They, therefore, consume less energy during operation and they can be constructed with considerable savings of materials. Also the hydraulic fluid does not overheat which greatly prolongs the life of the oil and all the close tolerance hydraulic parts and seals.

The wear and tear and stress on the ram-and-die combination is also greatly reduced, and this also results in major savings. Moreover, the die itself was customarily a tapered insert into a much larger, matingly tapered holder. It was difficult to transmit heat to the material in such an arrangement because the heat had passed through the holder before reaching the die itself. The difficulty of die heating was aggravated by dirt, corrosion and other heat-transfer disruptive effects at the interface between die and holder. Due to the reduced pressures which can be used in machines embodying the present invention, no separate holder for the die is required. Rather the die itself may be surrounded directly by the resistance heater bands as shown in the drawings of the present application. Again, the savings in materials and energy are very significant.

Also, the application of the resistance heater bands 24 directly to the body of die 19 makes possible more sensitive control of the heating, since there is not the high thermal lag of the prior art holder. This sensitivity of temperature control is further enhanced by the use of silicon controlled rectifier (SCR) power supplies (not shown) for supplying the required electrical heating energy to resistance heater bands 24.

This sensitivity of heating control is particularly important when thermosetting materials are to be extruded. The reason for this is the well-known tendency of such materials to set, i.e. to harden upon being heated. To prevent this from happening at the wrong point in this passage of the material through the die bore, it is necessary to closely regulate the heating effect.

Materials which have been extruded successfully by means of embodiments of the present invention include phenolics, melamine, epoxies, alkyds, thermosetting polyesters and polyimides, and also ultrahigh molecular weight polyethylene(UHMWPE), all in the form of molding compounds.

I claim:

1. In a machine for extruding material by means of a ram which propels the material through and out of the open end of a die, the machine having means for applying forces to the ram to move the ram alternately along a first path toward the die and a second path away from the die, the improvement comprising:
means operatively associated with said force applying means for controlling the force applying means to move the ram over the end portion of the first path at a substantially constant speed,
said control means having means for compensating for variations in back pressure from the material so as to maintain the ram speed substantially constant despite such variations.

2. The machine of claim 1 further comprising means operatively associated with said force control means for activating the force control means at the beginning of said first path.

3. The machine of claim 2 further comprising means operatively associated with said force control means for deactivating the force control means at the end of said first path.

4. The machine of claim 1 further comprising means operatively associated with said force applying means for adjusting the constant ram speed to any one of a plurality of rates.

5. The machine of claim 4 wherein the force applying means comprises
a displaceable piston positioned within a hydraulic cylinder and adapted to be connected to the ram,
means for introducing fluid into the cylinder on one side of the piston while withdrawing it on the opposite side to move the ram along the first path, and
means for introducing fluid into the cylinder on the opposite side while withdrawing it on the one side to move the ram along the second path.

6. The machine of claim 5 wherein the force control means comprises means operatively associated with said ram for regulating the rate of fluid withdrawal on said opposite side.

7. The machine of claim 6 wherein the regulating means comprises a variable control valve.

8. The machine of claim 7 wherein the valve is pressure compensated.

9. The machine of claim 8 wherein the valve is temperature compensated.

10. The machine of claim 9 wherein the force control means comprises means actuatable to bypass fluid around the valve.

11. In the process of extruding thermosetting material using a die, a ram movable along a first path toward the die to propel the material through the die, and along a second path away from the die, and external heating means for supplying heat to the die which cooperates with the heat produced by the ram pressure to soften the material as it is propelled through the die, the improvement which comprises:
controlling the force applied to the ram to move the ram over the end portion of the first path at a substantially constant speed, and
compensating for variations in back pressure from the material to maintain the ram speed substantially constant despite such variations.

12. The process of claim 11 wherein the speed is controlled so as not to be in excess of that at which the material softens substantially uniformly throughout its cross-section in response to external heat and the ram pressure heat.

13. The process of claim 11 wherein the compensating comprises compensating the forces moving the ram toward the die.

14. The process of claim 11 further comprising compensating the force applied to move the ram for variations in temperature of the material being propelled.

15. The machine of claim 1 further comprising:
means for introducing the material in particulate form between the ram and the die when the ram is away from the die.

16. The machine of claim 15 wherein the propulsion of the material by movement of the ram along the first path heats and thereby softens the material being propelled by the ram toward the die.

17. The machine of claim 16 further comprising means for cooling the throat of the die.

18. The machine of claim 16 further comprising means for externally heating the die, the heating means being coordinated with the ram movement along the first path so that the speed of the ram movement does not exceed that at which the material softens substantially uniformly throughout its cross-section in response to the external heat and the heat produced by the ram pressure.

19. The machine of claim 1 wherein the die is free of exit clamps.

20. The machine of claim 1 wherein the die is free of a surrounding die holder.

21. In a machine for extruding material by means of a ram which propels the material through and out of the open end of a die, the machine having means for applying forces to the ram to move the ram alternately along a first path toward the die and a second path away from the die, the first path having an end portion and a portion ahead of the end portion, the improvement comprising:
means operatively associated with said force applying means for controlling the force applying means to move the ram over the end porton of the first path at a substantially constant speed, and means operatively associated with said force applying means for controlling the force applying means to move the ram at a speed greater than the constant speed over the portion of the first path ahead of the end portion.

22. The process of claim 11 further comprising controlling the force applying means to move the ram at a speed greater than the constant speed over the portion of the first path ahead of the end portion.

23. The process of claim 22 wherein the controlling over the portion of the first path ahead of the end portion is responsive to variations in back pressure from the material to permit variations in the speed of the ram over the portion of the first path ahead of the end portion.

24. The process of claim 11 further comprising adjusting the constant ram speed to any one of a plurality of rates.

25. The process of claim 11 wherein the controlling is temperature compensated.

26. The process of claim 11 wherein the controlling is pressure compensated.

27. The process of claim 11 further comprising introducing the material in particulate form between the ram and the die when the ram is away from the die.

28. The process of claim 27 further comprising cooling the throat of the die.

29. The process of claim 11 further comprising externally heating the die and coordinating the heating with the movement of the ram along the first path so that the speed of the ram movement does not exceed that at which the material softens substantially uniformly throughout its cross-section in response to the external heat and the heat produced by the ram pressure.

* * * * *